July 9, 1968

L. C. DOZIER, JR 3,391,568

NAVIGATION SYSTEM

Filed May 10, 1965

INVENTOR.
LEONARD C. DOZIER JR.

BY

ATTORNEY

United States Patent Office 3,391,568
Patented July 9, 1968

3,391,568
NAVIGATION SYSTEM
Leonard C. Dozier, Jr., Fullerton, Calif., assignor to North American Rockwell Corporation, a corporation of Delaware
Filed May 10, 1965, Ser. No. 454,593
5 Claims. (Cl. 73—1)

ABSTRACT OF THE DISCLOSURE

An inertial navigation system with means for determining when drift errors occur. The device employs two identical stable platform type systems of conventional construction, each including two gimbals, two accelerometers and two gyros. The accelerometers of each platform are maintained at a 45° angle from the accelerometers of the other system. Four computers are provided to constantly compare the integrated output of each accelerometer with the velocity along its axis as resolved from the integrated output of the accelerometers in the other stable platform system.

---

Figure 1:
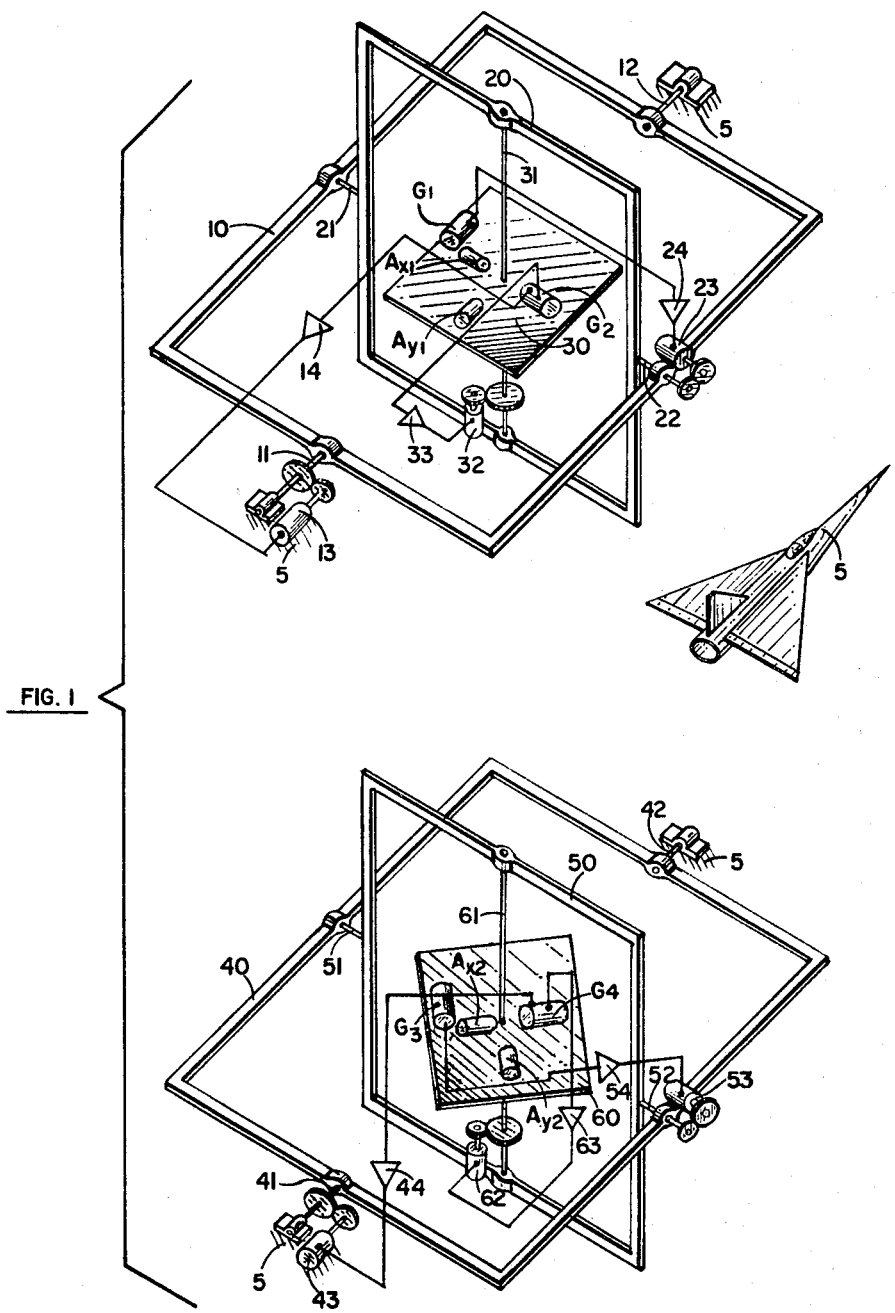

This invention relates to a navigation system and more specifically to a means and a method for determing errors in a navigation system.

Normally, when navigating a vehicle with a single navigation system, such as an inertial navigation system, there is virtually no satisfactory way to determine when relatively small errors such as drift errors occur in the system. Such errors accumulate and provide faulty output indications of the acceleration, velocity and position of the vehicle. Thus, it has been proposed that in order to improve reliability by determining these errors, it is necessary for the vehicle to have three complete navigation systems so that a "vote" can be taken to determine if one of the systems has a faulty indication. More specifically, if all three such systems provide the same velocity information, it is presumed that all three systems are correct. If, however, two of the systems provide the same or substantially the same velocity or acceleration information for a given direction, but the third system does not provide such information, it can therefore be presumed that the third system is in error and the navigation is done on the basis of the velocity information from the first two systems. That is, the output of the third system is rejected. Such a scheme, however, is unsuitable for certain applications where space and/or cost are a factor.

With such fundamental type error rejecting scheme, it is necessary to have three complete navigation systems. That is, if only two navigation systems are employed and corresponding information from the systems disagree, the simple vote type scheme will not be able to indicate which of the two systems is in error.

A feature of the present invention is determining errors in a navigation system whereby a first measurement of the movement of the vehicle is obtained along a first axis of a first instrument and a second measurement of movement of the vehicle is obtained along a second axis of a second instrument. These axes are not orthogonal or parallel. The components of these two measurements along a reference axis are compared to thereby indicate any error in the two measurements. The reference axis in the preferred form is either the first or the second axis. By utilizing this principle, a plurality of different equations can be derived and compared to determine small cumulative errors. More specifically, when two platforms are utilized, four equations can be derived from the two sets of accelerometers which are positioned in a nonorthogonal, nonparalel relationship.

Accordingly, an object of the invention is to provide a navigation system for a vehicle having a relatively high degree of reliability.

Still another object of the invention is the provision of a reliable, simple error detecting means and method for a navigation system.

A still further object of the invention is to provide a method and means for determining errors in a navigation system with a minimum of components and parts.

A still further object of the invention is the provision of a highly reliable method or navigation system utilizing a minimum of parts and size.

Figure 2:
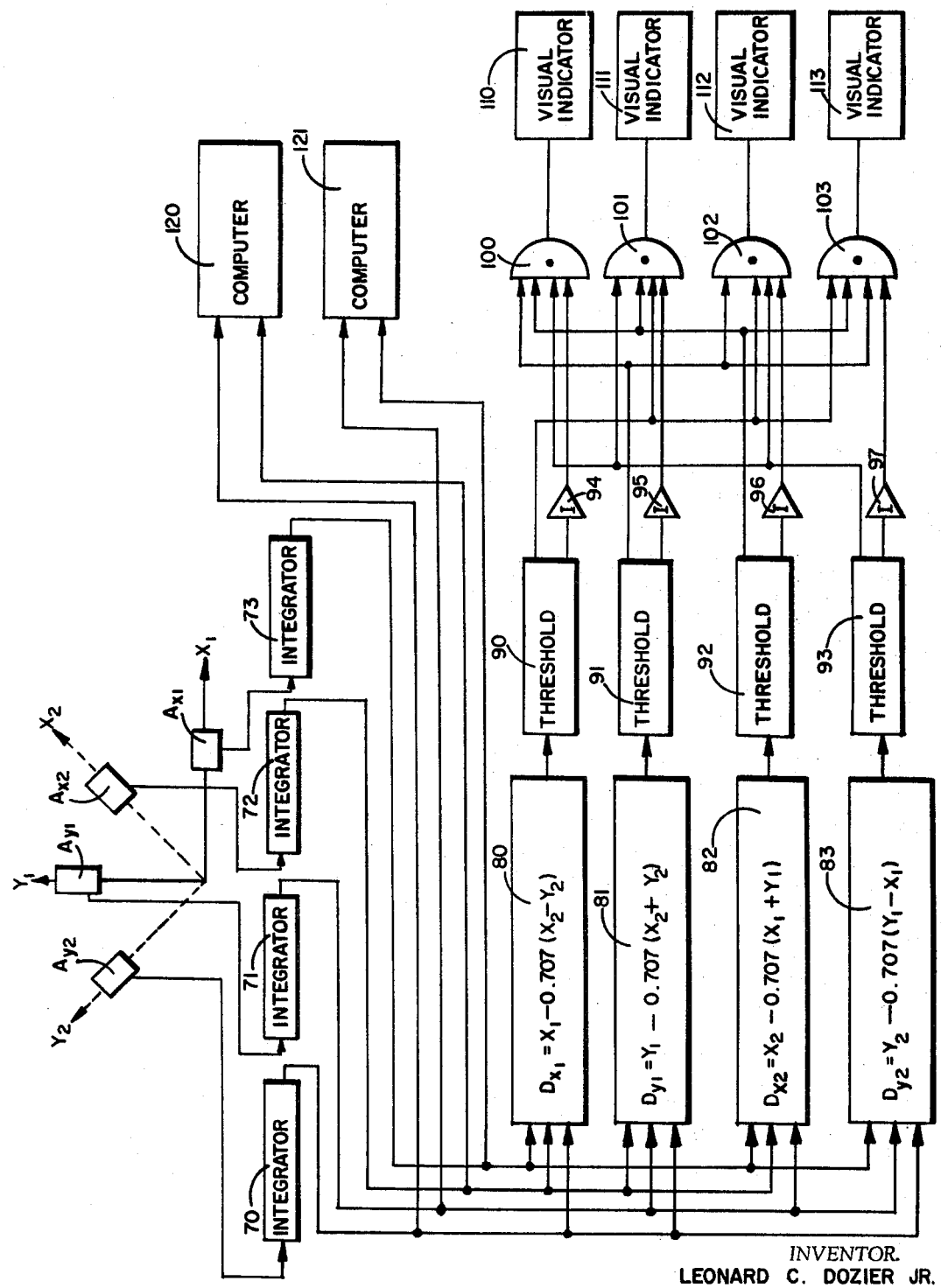

These and other objects and advantages of the invention will become apparent from a reading of the specification and examination of the drawings in which:

FIG. 1 illustrates two conventional inertial platforms utilized in practicing the invention; and FIG. 2 illustrates a schematic diagram in block form of circuitry utilized in an embodiment of the invention.

FIG. 1 illustrates the two inertial stable platform systems utilized in the present invention. More specifically, a first platform system is mounted on a vehicle such as an airplane 5 and includes an outer gimbal 10 which has pins 11 and 12 fixed thereto and rotatably mounted on the frame of the aircraft 5 for rotation about the roll axis. The first platform system also includes an inner gimbal 20 which has pins 21 and 22 fixed thereto which are rotatably mounted on the outer gimbal 10 for rotation of gimbal 20 about the pitch axis which is perpendicular to the roll axis defined by pins 11 and 12. A stable platform 30 is fixedly mounted on and perpendicular to a rod 31 which in turn is rotatably mounted on the gimbal 20 for rotation about the azimuth axis (perpendicular to the pitch axis). The stable platform 30 includes an $x$ accelerometer $A_{x1}$ and a $y$ accelerometer $A_{y1}$. These accelerometers are positions to sense acceleration in the mutually perpendicular directions. The platform 30 also has two gyros $G_1$ and $G_2$ which are utilized to stabilize the platform. These gyros are, for purposes of illustration, two degree-of-freedom gyros with gyro $G_2$ operating through an amplifier 14 to provide stabilization about the roll axis through a servo motor 13. The gyro $G_1$ is connected through an amplifier 24 to a servo motor 23 so as to provide servo control over gimbal 20 and thereby provide stabilization about the pitch axis. Gyro $G_2$ is also connected through an amplifier 33 to a servo motor 32 so as to provide stabilization about the axis defined by rod 31.

The above described platform and gimbal system is conventional so that a detailed explanation thereof is not considered necessary.

The inertial platform shown in the lower portion of FIG. 1 is identical to the gimbal and platform system described above except that in practicing the invention, the accelerometers of the platform are maintained at an angle of 45 degrees with respect to the accelerometers of the upper platform. This platform includes an outer gimbal 40 having pins 41 and 42 fixed thereto and extend outwardly therefrom. These pins are rotatably mounted on the frame of the aircraft 5 for rotation of gimbal 40 about the roll axis. Another gimbal 50 has pins 51 and 52 fixed thereto extending outwardly therefrom which are rotatably mounted on the gimbal 40. This provides for rotation of gimbal 50 about the pitch axis. A platform 60 is fixedly mounted on a rod 61. Rod 61 is rotatably mounted on gimbal 50 for rotation of platform or stable element 60 about the yaw axis. Two accelerometers $A_{x2}$ and $A_{y2}$ are positioned on the stable platform 60 for sensing accelerations in two mutually perpendicular directions. A gyro $G_4$ has its output connected to an amplifier 44 which is connected to a servo motor 43 so as to provide stabilization about the roll axis. Gyros $G_3$ and $G_4$ are two degree-of-freedom gyros so that gyro $G_3$ is connected through an amplifier 54 to a servo motor 53 to thereby provide stabilization of gimbal 50 about the pitch axis. Gyro $G_4$ is also connected through an amplifier 63 to a servo motor 62 so as to provide stabilization of platform 60 about the azimuth axis. By the above described servos and gyros, the platforms 30 and 60 are maintained level with earth; however, the accelerometers $A_{x2}$ and $A_{y2}$ are located, as shown, 45 degrees from accelerometers $A_{x1}$ and $A_{y1}$ by these platforms being maintained at 45 degrees.

It will be understood that rather than accelerometers, velocity meters could be employed. As shown in FIG. 2, the accelerometers $A_{x1}$ and $A_{y1}$ are sensing accelerations along mutually perpendicular $x_1$ and $y_1$ axis. On the second platform, the accelerometer $A_{x2}$ senses accelerations along the $x_2$ axis whereas on the same platform the accelerometer $A_{y2}$ senses accelerations along the $y_2$ axis that is perpendicular to the $x_2$ axis. The axis $x_2$ is maintained at a 45 degree angle to the $x_1$ and $y_1$ axes; consequently, axis $y_2$ is located at 45 degrees to axis $y_1$.

The accelerometer $A_{y2}$ provides acceleration information to an integrator 70; accelerometer $A_{y1}$ provides acceleration information to an integrator 71; accelerometer $A_{x2}$ provides acceleration information to an integrator 72; and accelerometer $A_{x1}$ provides acceleration information to an integrator 73. In the embodiment illustrated in the drawing, the integrators 70 through 73 are operative to provide velocity information to a pair of computers 120 and 121. If velocity meters are utilized in lieu of the accelerometers, integrators 70 through 73 would not be used. Integrators 70 and 72 are connected to computer 120 so as to provide the velocity information from the lower platform shown in FIG. 2 to this computer. Integrators 71 and 73 are connected to computer 121 so as to provide velocity information from the upper platform shown in FIG. 1 to this computer.

In practicing the invention, the components of velocity measured by the second platform (lower platform in FIG. 1) along the $x_1$ axis are subtracted from velocity information obtained through the accelerometer $A_{x1}$. Likewise, the components of velocity measured by the second platform along the $y_1$ axis are compared (subtracted) with the velocity information obtained from accelerometers $A_{y1}$. Additionally, the components of velocity from the upper platform along the $x_2$ and $y_2$ are subtracted respectively from the velocity information derived from $A_{x2}$ and $A_{y2}$ accelerometers. Rather than comparing velocity information, the integral of velocity information could be compared. In such an embodiment 70, 71, 72 and 73 would be double integrators.

In the following equations, $x_1$ represents velocity information obtained from the integrated output of accelerometer $A_{x1}$; $y_1$ represents the integrated output of accelerometer $A_{y1}$; $x_2$ represents the integrated output of $A_{x2}$ and $y_2$ represents the integrated output (velocity information) of accelerometer $A_{y2}$. Four computations are obtained which, as explained above, are the difference between the integrated output of the accelerometer of one platform and the component of the measured integrated output from the other platform along the axis of the acelerometer of the first paltform. This is accomplished by units 80, 81, 82 and 83. Analogue or digital techniques can be employed to perform any of these functions. In these units, $D_{x1}$ represents such a comparison or difference along the $x_1$ axis; $D_{y1}$ represents such a comparison along the $y_1$ axis; and $D_{x2}$ represents such a comparison along the $x_2$ axis, whereas $D_{y2}$ represents such a difference along the $y_2$ axis. In the embodiment illustrated, velocity information derived from the accelerometers is compared. As stated above, it will be understood that integrated velocity information could be compared with similar results. In such a case, the integrators 70, 71, 72 and 73 would be double integrators.

Ideally, the above compared differences should be zero. However, as a practical matter, there will always be some difference and particularly due to accumulation of small errors such as drift errors resulting in an output from each one of the units 80, 81, 82, and 83. In unit 80, the difference ($D_{x1}$) between the measured velocity information along the $x_1$ $$\text{axis} = x_1 - (0.707(x_2 - y_2))$$

taking into account that the components $x_2$ and $y_2$ along the $x_1$ axis is a function of the cosine of 45 degrees (.707) times the measured velocity information derived from the accelerometers. Thus, it will be readily seen that the difference ($D_{y1}$) along the $y_1$ axis as computed by the two platforms $= y_1 - 0.707(x_2 + y_2)$. Likewise, the difference ($D_{x2}$) between the measured position information along the $x_2$ axis equals $x_2 - .707(x_1 + y_1)$. Finally, the difference ($D_{y2}$) between the velocity information measured on the two platforms along the $$y_2 = y_2 - 0.707(y_1 - x_1)$$

The output $D_{x1}$ of unit 80 is applied to a threshold 90 whereas the output $D_{y1}$ of unit 81 is applied to a threshold 91; the output of unit 82 ($D_{x2}$) is applied to a threshold 92 and unit 83 has its output $D_{y2}$ applied to a threshold 93. Thresholds 90 through 93 can be said to be some specific fraction of a maximum permissible error. Let this level be designated as G. When any of these differences exceed G, there will be an output at the corresponding threshold 90 through 93. If the conditions below prevail, the pilot of the aircraft can be alerted to which one of the measured position informations $x_1$, $y_1$, $x_2$ or $y_2$ is in error, and as a result, he may then elect to utilize the information from the computer 120 or 121 which does not contain the offending information. From the formula for the difference, it can be seen that:

| If | Then Reject | Accelerometer in Error |
|---|---|---|
| $D_{y1} < G$, All others $> G$ | $x_1$ | $A_{x1}$ |
| $D_{x1} < G$, All others $> G$ | $y_1$ | $A_{y1}$ |
| $D_{y2} < G$, All others $> G$ | $x_2$ | $A_{x2}$ |
| $D_{x2} < G$, All others $> G$ | $y_2$ | $A_{y2}$ |

To determine if the above conditions occur, an And gate 100 has an input from thresholds 91, 92 and 93 and an inverted input from threshold 90 via an inverter 94. Thus, there will be an output from And gate 100 when $D_{x1}$ is less than level G and all the other thresholds 91, 92 and 93 have outputs above level G. The inverter 94 as well as inverters 95, 96 and 97 will have an output signal to the And gates 100–103 that is a one when there is no or zero output from the corresponding threshold. When there is an output from the corresponding threshold, there will be no output or zero output from the inverter. If the And gate 100 has an output, this will indicate that the measured output from accelerometer $A_{y1}$ should be rejected as indicated by a visual indicator 110. And gate 101 has inputs from thresholds 90, 92 and 93 as well as an inverted input from threshold 91 through inverter 95. If these is an output from And gate 101, a visual indicator 111 will indicate that information $x_1$ from accelerometer $A_{x1}$ is in error.

And gate 102 has inputs from thresholds 90, 91 and 93 as well as an input from threshold 92 through inverter 96. If there is a signal or one on all these inputs, a visual indicator 112 will indicate an error in the $y_2$ information coming from accelerometer $A_{y2}$.

The And gate 103 has inputs from thresholds 90, 91 and 92 as well as from threshold 93 through inverter 97. If there are ones or a signal on the four of these inputs, a visual indicator 113 will indicate an error in the $x_2$ information coming from accelerometer $A_{x2}$.

Thus, the above described system sets forth a means and a method for rejecting information which is in error without utilizing the relatively large and expensive voting scheme described above which utilizes or necessitates three complete systems. More specifically, by utilizing only two sets of accelerometers that are not parallel or orthogonal, four separate equations are or can be derived. In utilizing these equations, it can be determined which accelerometer or velocity meter is in error. If four conditions are met in any of the And gates 100, 101, 102 or 103, an output therefrom indicates an error in a single accelerometer or velocity meter.

Although the invention has been described and illustrated in detail, it is clearly understood that the same is by way of illustration and example only and is not to be taken by way of limitation, and various changes and modifications could be made without departing from the spirit and scope of the invention.

I claim:

1. A method of determining errors in a navigation system for a vehicle comprising, obtaining a first measurement of movement of the vehicle along a first axis, obtaining a second measurement of movement of the vehicle along a second axis, obtaining a third measurement of movement of the vehicle along a third axis that is perpendicular to the first axis, obtaining a fourth measurement of movement of the vehicle along a fourth axis that is perpendicular to the second axis, comparing the components of the second and fourth measurements along the first axis with the first measurement, comparing the components of the first and third measurements along the second axis with the second measurement, comparing the components of the second and fourth measurements along the third axis with the third measurement and comparing the components of the first and third measurements along the fourth axis with the fourth measurement.

2. A navigation system for a vehicle comprising, means obtaining a first measurement of movement of the vehicle along a first axis, means obtaining a second measurement of movement of the vehicle along a second axis, means obtaining a third measurement of movement of the vehicle along a third axis that is perpendicular to the first axis, means obtaining a fourth measurement of movement of the vehicle along a fourth axis that is perpendicular to the second axis, first means comparing the components of said second and fourth measurements along the first axis with said first measurement, second means comparing the components of said first and third measurements along the second axis with said second measurement, third means comparing the components of the second and fourth measurements along the third axis with said third measurement and fourth means comparing the components of said first and third measurements along the fourth axis with said fourth measurement.

3. A navigation system as set forth in claim 2 further comprising first error detecting means actuated in response to the outputs of said second, third and fourth comparing means exceeding a predetermined level and the output of said first comparing means being less than said level.

4. A navigation system as set forth in claim 3 further comprising second error detecting means actuated in response to the outputs of said first, third and fourth comparing means exceeding said predetermined level and the output of said second comparing means being less than said level, third error detecting means actuated in response to the outputs of said first, second and fourth comparing means exceeding said predetermined level and the output of said third comparing means being less than said level, and fourth error detecting means actuated in response to the outputs of said first, second and third comparing means exceeding said predetermined level and the output of said fourth comparing means being less than said predetermined level.

5. A method of determining errors in a navigation system for a vehicle comprising, obtaining a first measurement of movement of the vehicle along a first axis, obtaining a second measurement of movement of the vehicle along a second axis, obtaining a third measurement of movement of the vehicle along a third axis that is perpendicular to said first axis, obtaining a fourth measurement of movement of the vehicle along a fourth axis that is perpendicular to said second axis, comparing the components of the second and fourth measurements along the first axis with the first measurement to provide a first signal, comparing the components of the first and third measurements along the second axis with the second measurement to provide a second signal, comparing the components of the second and fourth measurements along the third axis with the third measurement to provide a third signal, comparing the components of the first and third measurements along the fourth axis with the fourth measurement to provide a fourth signal, providing a first indication in response to said second, third and fourth signals exceeding a predetermined level and said first signal being less than said predetermined level, providing a second indication in response to said first, third and fourth signals exceeding said predetermined level and said second signal being less than said predetermined level, providing a third indication in response to said first, second and fourth signals exceeding said predetermined level and said third signal being less than said predetermined level, and providing a fourth indication in response to said first, second and third signals exceeding said predetermined level and said fourth signal being less than said predetermined level.

References Cited

UNITED STATES PATENTS 3,028,592    4/1962    Parr et al.

FOREIGN PATENTS 204,146    11/1956    Australia.

S. CLEMENT SWISHER, *Acting Primary Examiner.*

LOUIS R. PRINCE, *Examiner.*